(12) United States Patent
Trauba

(10) Patent No.: US 8,705,863 B1
(45) Date of Patent: Apr. 22, 2014

(54) METHOD AND SYSTEM FOR PROVIDING A COMPUTER IMPLEMENTED CONTROL SYSTEM FOR AN AUTOMATED SYSTEM

(75) Inventor: Andrew Trauba, San Francisco, CA (US)

(73) Assignee: Encela Technologies LLC, San Francisco, CA (US)

( * ) Notice: Subject to any disclaimer, the term of this patent is extended or adjusted under 35 U.S.C. 154(b) by 458 days.

(21) Appl. No.: 12/896,530

(22) Filed: Oct. 1, 2010

Related U.S. Application Data

(60) Provisional application No. 61/355,101, filed on Jun. 15, 2010.

(51) Int. Cl.
- *G06K 9/66* (2006.01)
- *G06K 9/00* (2006.01)
- *G06K 9/62* (2006.01)
- *G06K 9/64* (2006.01)

(52) U.S. Cl.
USPC ........... 382/190; 382/102; 382/106; 382/209; 382/219; 382/109

(58) Field of Classification Search
USPC .......................... 382/190, 209, 102, 106, 219
See application file for complete search history.

(56) References Cited

U.S. PATENT DOCUMENTS

| | | | | |
|---|---|---|---|---|
| 6,823,500 B1* | 11/2004 | Ganesh et al. | | 716/115 |
| 7,286,899 B2* | 10/2007 | Dachs et al. | | 700/200 |
| 8,000,832 B1* | 8/2011 | Schmidtke et al. | | 700/182 |
| 2005/0216828 A1* | 9/2005 | Brindisi | | 715/512 |
| 2009/0326874 A1* | 12/2009 | Nakamura et al. | | 703/1 |
| 2011/0037497 A1* | 2/2011 | Or-Bach | | 326/38 |

* cited by examiner

*Primary Examiner* — Bernard Krasnic
*Assistant Examiner* — Weiwen Yang
(74) *Attorney, Agent, or Firm* — Dergosits & Noah LLP

(57) ABSTRACT

Methods, systems and computer program products are described for providing a computer implemented control system for an automated system. The system includes a document receiving component configured for receiving a plurality of design documents and for rendering a plurality of design document views corresponding to the plurality of design documents. The system also includes an input receiving component configured for receiving an indication selecting first and second design document views, a data extraction component configured for automatically extracting design data from the first and second design document views, a matching component configured for determining a relationship between the design data from the first and second design document views, and a data manager component configured for storing the relationship in a data store accessible by a computer implemented control system that controls a plurality of devices in the automated system based on the stored relationship.

18 Claims, 8 Drawing Sheets

| BILL OF MATERIAL ||| 
|---|---|---|
| QTY | DESCRIPTION | PART NUMBER |
| 1 | HOFFMAN ENCLOSURE 72" X 72"X12" DEEP | A-727212ULP |
| 1 | HOFFMAN INNER PANEL | A72P72 |
|  |  |  |
| 1 | TEXAS INSTRUMENT 505 SERIES I/O RACK | 505-6508 |
| 1 | T.I. 120/230 VAC POWER SUPPLY | 505-6660 |
| 3 | T.I. 110 VAC INPUT BOARD (502) | 505-4232-A1, A2, A3 |
| 2 | T.I. 20-132 VAC ½ AMP OUTPUT BOARD | 505-4632 |
| 1 | T.I. DISTRIBUTED BASE CONTROLLER | 505-6840 |
|  |  |  |
| 2 | GOULD MIDGET CLASS FUSE BLOCK | 30323R |
| 2 | GOULD SHAWMUT CLASS CC FUSE 8 AMP | ATMR-8 |
| 3 | GOULD SHAWMUT FUSE CLASS CC 10 AMP | ATMR-10 |
| 2 | GROUND LUG 2/0 MAXIMUM |  |
|  |  |  |
| 2 | A-B 11-IN TUBE BASE RELAY SOCKET | 700-HN102 |

500 *FIG. 5A*

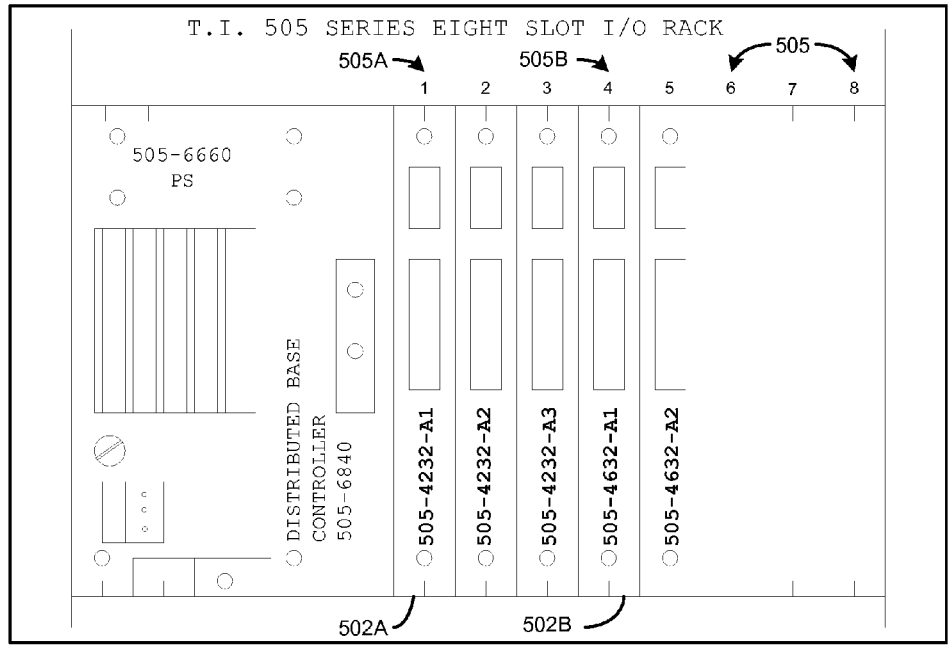

504 *FIG. 5B*

METHOD AND SYSTEM FOR PROVIDING A COMPUTER IMPLEMENTED CONTROL SYSTEM FOR AN AUTOMATED SYSTEM

CROSS-REFERENCE TO RELATED APPLICATIONS

This application claims priority to a provisional application entitled "METHOD AND SYSTEM FOR PROVIDING A COMPUTER IMPLEMENTED CONTROL SYSTEM FOR AN EXISTING (LEGACY) AUTOMATED SYSTEM," Ser. No. 61/355,101, filed Jun. 15, 2010, and herein incorporated in its entirety by reference.

BACKGROUND

Automated systems, such as package conveyor systems and car manufacturing systems, have been a central force in transforming manual work environments into electronic device supported environments. Such automated systems typically utilize large machinery and/or are situated in warehouses or factories where harsh conditions exist. For this and other reasons, programmable logic controllers (PLCs) are utilized to control the electronic devices and machinery on a factory assembly line or in a package distribution center, for example.

A PLC is designed for multiple input/output (I/O) arrangements that connect the PLC to sensors and actuators. As inputs, PLCs read limit switches, analog process variables, e.g., such as temperature and pressure, and the positions of complex positioning systems. On the actuator side, PLCs control electric motors, pneumatic or hydraulic cylinders, magnetic relays, solenoids, or analog outputs. The I/O arrangements may be built into a simple PLC, or the PLC may access external I/O modules through a shared computer network. Typically, this network is in the form of a proprietary backplane, where each module can be mounted into one of many available slots in an enclosed rack.

PLCs are programmable to execute control instructions based on sensor inputs. Control instructions used with most PLCs are written in a language format referred to as "ladder logic." Ladder logic is a rule-based language format that represents a program by a graphical diagram based on the circuit diagrams of relay-based logic hardware. The language format derives its name from the ladder-like resemblance of the graphical diagram, with two vertical rails and a series of horizontal rungs between them. Each rung in the ladder represents a rule. When implemented in a PLC, the rules are typically executed sequentially, in a continuous loop.

Some PLCs are programmed using proprietary programming panels or special-purpose programming terminals, which often have dedicated function keys representing the various logical elements of PLC programs. Most PLCs are programmed using proprietary software written for use on desktop computers, and for connecting between the desktop computer and the PLC. Such proprietary software typically allows entry of the ladder style logic of the control instructions, and then may provide additional functionality to assist debugging and troubleshooting the control instructions during installation. The proprietary software typically allows uploading and downloading of the control instructions between the computer and the PLC, for backup and restoration purposes. Alternatively, programming boards can be used to hard wire the logic into the PLC by the use of a removable chip, e.g., an EEPROM, where the control instructions are transferred to the programming board from a workstation via serial or other bus logic.

Once the control instructions are installed in the PLC, and tested against the devices at a customer site, the automated system is ready and production begins. The control instructions are embedded in the PLC, which dutifully and reliably performs its function in a closed "black box" environment.

While using a PLC to control an automated system is advantageous because the PLC is sturdy and reliable, it also presents serious challenges when production conditions change and adjustments or changes to the control instructions are necessary. When the PLC's control instructions need to be adjusted to respond, for example, to an unforeseen problem, all that exists is the rungs and coils of the ladder logic program. Typically, the programmer who originally programmed the ladder logic is no longer available and the control instructions are essentially static.

SUMMARY

Methods, systems and computer program products are described for providing a computer implemented control system for an automated system comprising a plurality of devices. In an aspect, a system comprises a document receiving component configured for receiving a plurality of design documents associated with an automated system and for rendering a plurality of design document views corresponding to the plurality of design documents. The system also includes an input receiving component configured for receiving an indication selecting a first design document view and a second design document view, a data extraction component configured for automatically extracting design data from the first design document view and design data from the second design document view, where the design data from the first design document view is related to the design data from the second document view, a matching component configured for determining a relationship between the design data from the first design document view and the design data from the second design document view, and a data manager component configured for storing the relationship in a data store accessible by the computer implemented control system, wherein the computer implemented control system controls the plurality of devices in the automated system based on the relationship stored in the data store.

In another aspect, a method for providing a computer implemented control system for an automated system comprises receiving by a document receiving component a plurality of design documents associated with an automated system and rendering a plurality of design document views corresponding to the plurality of design documents, receiving by an input receiving component an indication to select a first design document view and a second design document view of the plurality of design document views, extracting automatically by a data extraction component design data from the first design document view and design data from the second design document view, wherein the design data from the first design document view is related to the design data from the second document view, determining by a matching component a relationship between the design data from the first design document view and the design data from the second design document view, and storing by a data manager component the relationship in a data store accessible by the computer implemented control system, wherein the computer implemented control system controls the plurality of devices in the automated system based on the relationship stored in the data store.

In another aspect, a computer readable storage medium containing program instructions when executed by a computer implementing a process for providing a computer implemented control system for an automated system is defined. The process comprises receiving by a document receiving component a plurality of design documents associated with an automated system and rendering a plurality of design document views corresponding to the plurality of design documents, receiving by an input receiving component an indication to select a first design document view and a second design document view of the plurality of design document views, extracting automatically by a data extraction component design data from the first design document view and design data from the second design document view, wherein the design data from the first design document view is related to the design data from the second document view, determining by a matching component a relationship between the design data from the first design document view and the design data from the second design document view, and storing by a data manager component the relationship in a data store accessible by the computer implemented control system, wherein the computer implemented control system controls the plurality of devices in the automated system based on the relationship stored in the data store.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

FIG. 5A-5D illustrate exemplary design document views according to an embodiment;

DETAILED DESCRIPTION

The subject matter presented herein describes a system for providing a computer implemented control system for an automated system. In an aspect, the computer implemented control system is removed from the closed environment of the PLC and operates in an open "data driven" environment that uses relationship data stored in a data store to control the system. According to an embodiment, design documents, such as computer aided design (CAD) drawings, associated with an automated system can be rendered into design document views, which can be displayed to a user and manipulated. The design document views can be used to determine relationships between devices in the automated system and their control environments. Once determined, the relationships are stored in a data store, for example, in a table in a database, which is accessible by the computer implemented control system, and are used to control the plurality of devices in the automated system.

According to an embodiment, CAD drawings associated with the automated system are typically generated at the time of system design and installation. The drawings typically depict not only the target system, but also renderings of a symbol for each device, in locations that approximate the actual locations of those devices on the actual automated system. Other design documents can include drawings of a master control panel, and electronic sub-systems mounted inside the master control panel. These drawings can include the rack containing the I/O control modules, separate drawings of each I/O control module, and wiring descriptions of each device attached to each I/O control point of a particular control module. When the design documents are rendered into views, the design data of the design document views can be mapped from one document view to another, and from those data mappings, the relationship data for controlling the automated system can be derived.

In an embodiment, because the relationship data is stored and can be retrieved any time a new instance of a view is rendered, ordinarily static CAD drawings describing an automated system can be transformed into views that are collectively a dynamic, interactive portal to the automated system—a virtual system where the view is, for all intents and purposes, the system. Accordingly, the views can be used interactively to configure the system, to upgrade the system, to test the system, to maintain the system, and to function as a system simulator. Moreover, during production, the CAD views can function as a tool for monitoring and maintaining the system.

Figure 1:
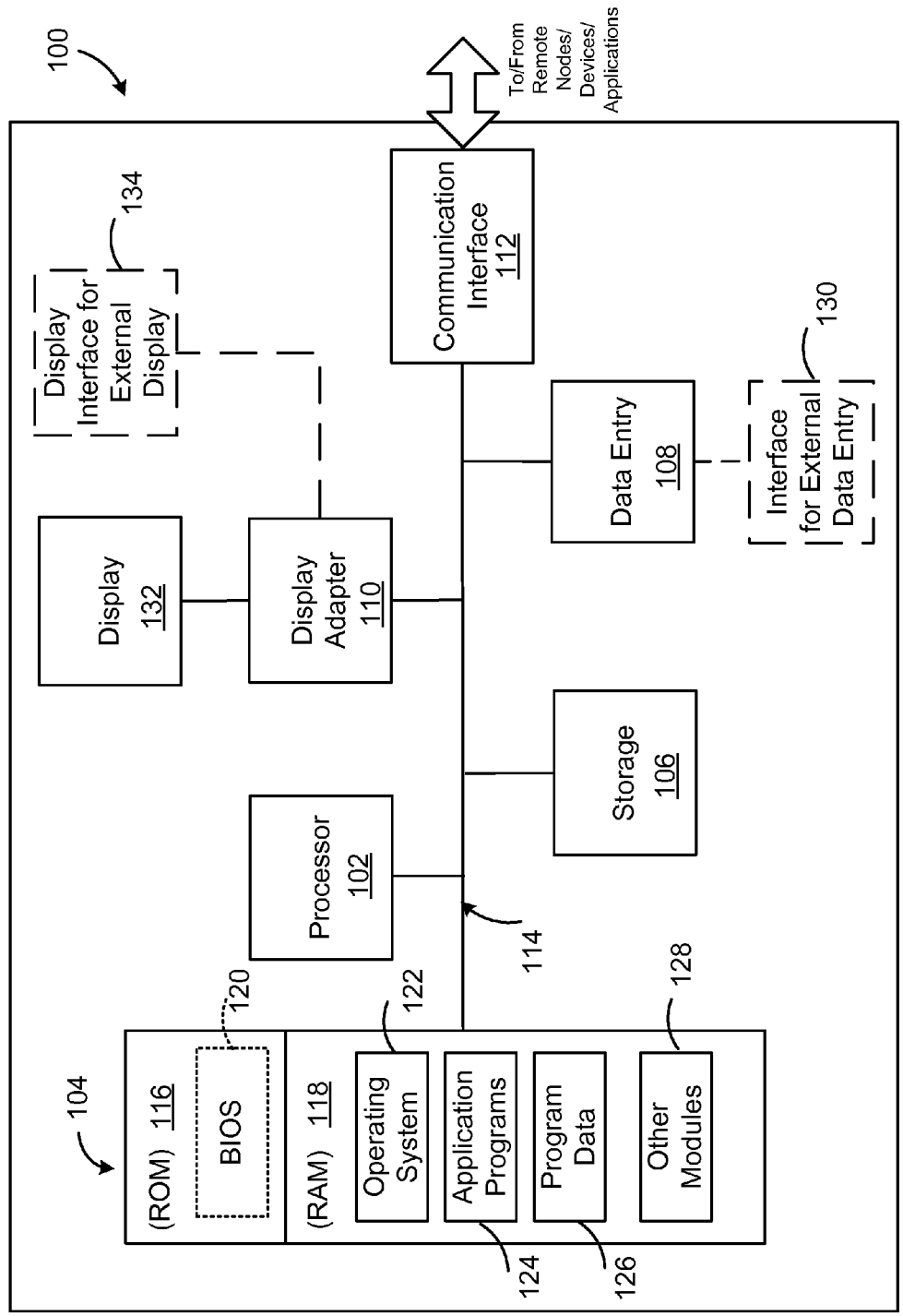
FIG. 1 is a block diagram illustrating an exemplary hardware device in which the subject matter may be implemented.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100. It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

Figure 2:
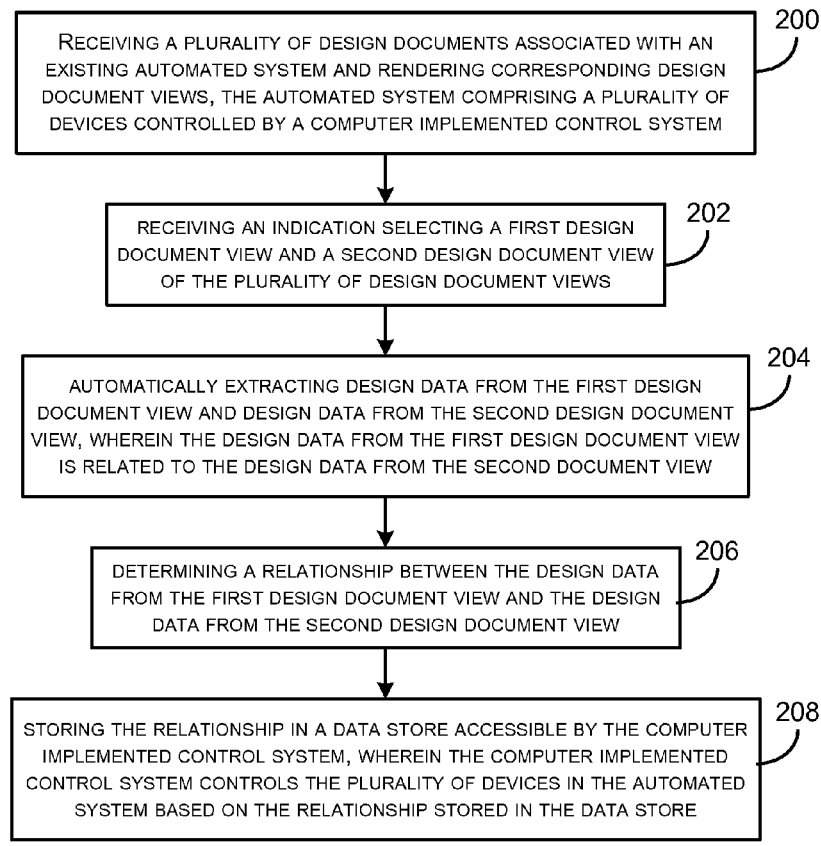
FIG. 2 is a flow diagram illustrating a method for providing a computer implemented control system for an automated system according to an exemplary embodiment.
Figure 3:
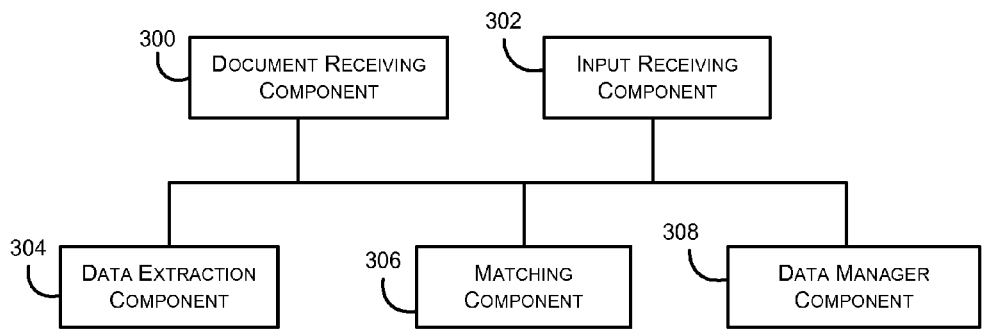
FIG. 3 is a block diagram illustrating a system for providing a computer implemented control system for an automated system according to an exemplary embodiment.
Figure 4:
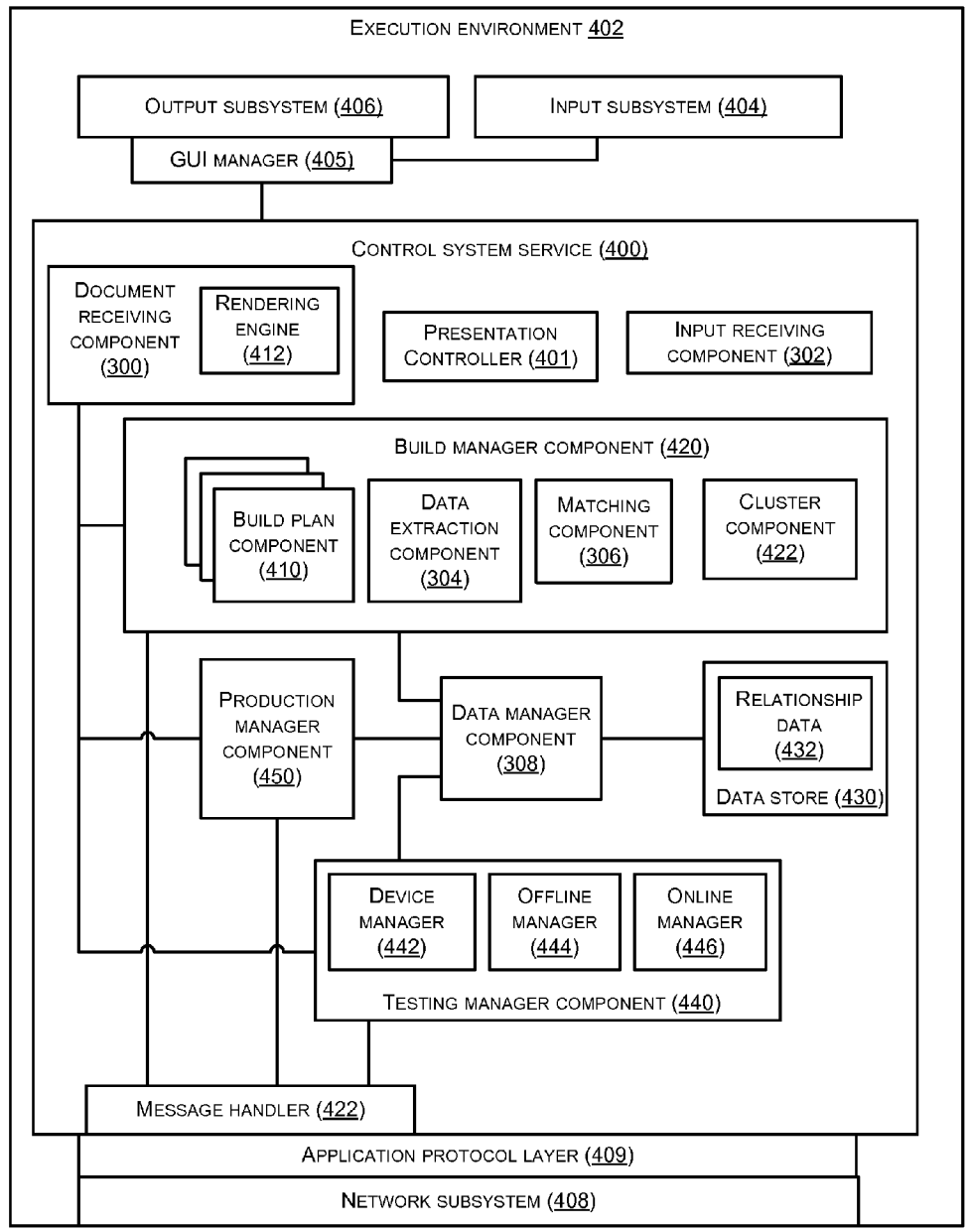
FIG. 4 is a block diagram illustrating another system for providing a computer implemented control system for an automated system according to an exemplary embodiment.

Referring now to FIG. 2, a flow diagram is presented illustrating a method for providing a computer implemented control system for an automated system according to an exemplary embodiment. FIGS. 3 and 4 are block diagrams illustrating systems for providing a computer implemented control system for an automated system according to embodiments of the subject matter described herein. In particular, FIG. 3 illustrates an arrangement of components configured for providing a computer implemented control system for an automated system, while FIG. 4 illustrates the components of FIG. 3 and/or their analogs adapted for operation in an execution environment provided by a node for providing a computer implemented control system for an automated system. The method illustrated in FIG. 2 can be carried out by, for example, at least some of the components in each of the exemplary arrangements of components illustrated in FIGS. 3 and 4. The arrangement of components in FIG. 4 may be implemented by some or all of the components of the hardware device 100 of FIG. 1.

FIG. 3 illustrates components that are configured to operate within an execution environment hosted by a node and/or multiple nodes, as in a distributed execution environment. For example, in FIG. 6, which illustrates a plurality of nodes communicatively coupled to one another via a network 601 such as a wireless LAN or WAN, a control service node 602 can be configured to provide an execution environment configured to support the operation of the components illustrated in FIG. 3 and/or their analogs. Exemplary nodes can include desktop computers, servers, networking nodes, notebook computers, PDAs, mobile phones, digital image capture devices, and the like.

Illustrated in FIG. 4 is a control system service 400 including the components illustrated in FIG. 3 adapted for operating in an execution environment 402. FIG. 1 illustrates key components of an exemplary device that can provide the exemplary execution environment 402. The components illustrated in FIG. 3 and FIG. 4 can be part of the components of FIG. 1 and/or separate components of FIG. 1. For example, a network subsystem 408 in FIG. 4 can be part of communication interface 112 in FIG. 1 and/or a separate component in communication with communication interface 112. The execution environment 402, or an analog, can be provided by a node, e.g., the control service node 602.

The control system service 400 operating in the execution environment 402 includes a presentation controller component 401 configured to manage the service's graphical user interface (GUI). The presentation controller component 401 is configured to communicate with a GUI manager component 405. The GUI manager component 405 can be configured to present a GUI on a display, such as the display 132. The GUI manager component 405 can be configured to present content via an output subsystem 406 which can include, for example, a graphics library (not shown) providing drawing capabilities, and a device driver (not shown) for communicating with a display adapter (not shown). The device driver and display adapter, such as the display adapter 110, can be configured to provide resources such as memory for storing data for a presentable representation of content. The presentable data can be provided to the display 132 for presenting via the display adapter.

As illustrated, the control system service 400 includes a message handler component 422 configured to route messages received via the network subsystem 408 and optionally via an application protocol layer 409 interoperating with the network subsystem 408. The message handler component 422 can be configured to send information as directed by a build manager component 420, a testing manager component 440, and a production manager component 450. For example, information can be received from the production manager component 450, and the message handler component 422 can be configured to send that information to another node via the network subsystem 408 optionally in cooperation with one or more application protocol layers 409. Data can be transmitted over a network via the communication interface 112 interoperating with the network subsystem 408.

As described above, input including user input, and/or input from components operating in the execution environment 402, can be received via an input subsystem component 404, and provided, for example to the GUI manager component 405 where the GUI manager component 405 can be configured to associate the input with a location/region on the display, for example, based on a position of a cursor. The input subsystem component 404 may be part of data entry component 108 and/or be separate from data entry component 108.

Referring now to FIG. 2, in block 200, a plurality of design documents associated with an automated system comprising a plurality of devices controlled by a computer implemented control system is received and a plurality of design document views corresponding to the plurality of design documents is rendered. In an embodiment, a system for providing a computer implemented control system for an automated system includes a document receiving component 300 configured for receiving a plurality of design documents associated with an automated system and for rendering a plurality of design document views corresponding to the plurality of design documents, where the automated system comprises a plurality of devices controlled by a computer implemented control system.

According to an embodiment, design documents are typically created for automated systems to assist in the initial design, configuration and installation of the system. Design documents can include CAD drawings of the overall automated system, drawings of symbols for each device in the automated system along with the locations of those devices in the system, drawings of the master control panel, and drawings of the electronic subsystems mounted inside the master control panel. The subsystems can include the rack, and its I/O control modules. The design documents can also include separate drawings of each I/O control module, and wiring descriptions of each device attached to each I/O control point of that control module, and a bill of material.

In an embodiment shown in FIG. 4, the control system service 400 comprises a plurality of build plan components 410. Each build plan component 410 can represent a build cycle, where the build cycle is expressed as an execution of an instance of a build plan. Each build cycle can correspond to a specific automated system type and/or to whether a new or existing system is being configured. In an embodiment, the presentation controller 401 can be directed to present a dropdown menu allowing a user to select from the plurality of build plan components 410. Each build plan component 410 guides the user through at least one build stage of the build cycle. In an embodiment, a build stage can represent a configuration session, where runtime parameterization can be accomplished by instantiation of that stage's corresponding build parameter instance.

For example, for an existing automated system, a user can select a "RETROFIT" build plan component 410 from a list of build plan components to configure an existing automated system based on the system's existing CAD documents. The RETROFIT build plan can include a plurality of stages comprising: a bill of material stage, an I/O distribution stage, an I/O layout stage, a device layout stage, and a cluster definition stage. Each stage can be assigned a set of build parameters, which are used in the configuration session representing each stage. The parameters can be modified during a configuration session, giving the user a runtime tool to affect the look and feel of each session.

According to an embodiment, the control system service 400 can include the document receiving component 300, which can receive the design documents via a file system (not shown). In an embodiment, the document receiving component 300 can include a rendering engine 412 that converts each design document in its native format, e.g., .DXF and/or .DWG, into a rendered view of the document. The rendering engine 412 can be a proprietary component, or a commercially available component, such as the component known as VDraft, produced by Soft Source.LLC.

Once rendered, the view of the design document can be presented, in an embodiment, as a thumbnail in a presentation window. For example, a plurality of thumbnail views representing the plurality of design documents can be displayed in a file structure. The view can be a dynamic representation of a snapshot of a current state of the view for the current build stage. For example, a new snapshot can be taken each time the stage is refreshed, and/or when the stage changes state because of activation of one of its controls. Moreover, statistics about the current build stage for a design document view can be presented when a cursor is placed over a thumbnail representing that view of the design document. The thumbnails can be enlarged or reduced using a slider control. Whatever the setting, the thumbnails can visually represent the current state of the system. For example, when the slider control is set to maximum, the thumbnail can provide enough resolution so that the user can determine the contents of each document view.

Referring again to FIG. 2, in block 202, an indication selecting a first design document view and a second design document view of the plurality of design document views is received. In an embodiment, a system for providing a computer implemented control system for an automated system includes an input receiving component 302 configured for receiving an indication selecting a first design document view and a second design document view of the plurality of design document views.

In an embodiment, the presentation window that includes the plurality of design document views, e.g., thumbnails, can also include a dialog box providing a list of the build stages corresponding to the build plan component 410 selected. A stage may be selected explicitly or implicitly. For example, each stage can have a corresponding radio button, and a stage can be selected explicitly by selecting its radio button. Alternatively or in addition, implicit navigation allows seamless transition to either a next stage or a previous stage from within a design drawing view. In one embodiment, implicit navigation can be controlled by a stage's runtime parameters.

According to an embodiment, when a build stage is selected and launched, the first and second design document views are selected corresponding to the build plan 410. In an embodiment, the first and second design documents can be selected automatically by the build manager component 420 based on a selected build stage. In another embodiment, the first and second design document views can be explicitly selected by a user. In yet another embodiment, the build manager component 420 can recommend which of a plurality design document thumbnail views should be launched by highlighting certain thumbnail views. The user then has the option of launching any of the recommended thumbnail views, or overriding the suggestions with a different set of thumbnail views. In all cases, the build manager component 420 can include the input receiving component 302, which can be configured to receive the indication from a user via a user interface supported by the presentation controller component 401.

For example, the presentation controller component 401 can be configured to interoperate with the GUI manager component 405 in the execution environment 402 to present a window for receiving the indication from the user. Input, such as user input, can be received from an input device, e.g., a keyboard or mouse (not shown), by the input subsystem 404 of the execution environment 402. The input can be received in correspondence with a representation of the first and/or second design document views presented by the GUI manager component 405 interoperating with the display device, e.g., display 132, as directed by the presentation controller component 401. The user can select the first design document view by double clicking the thumbnail representing the first design document, or by single clicking the thumbnail and clicking a Launch button. In a similar manner, the second design document view can be selected. In response, the selected views can be displayed in separate windows or in the same window, e.g., side-by-side. In an embodiment, the user can reposition and/or enlarge the view(s) so that it is centered and/or readable in the window.

According to another embodiment, more than two design documents can be selected by the user depending on the build plan 410. For example, when the selected first design document includes references or elements relating to more than one second design document, those second design documents can be selected in any of the ways described above. For example, the second design documents can be selected automatically by the build manager component 420, or selected explicitly by the user.

Referring again to FIG. 2, in block 204, design data from the first design document view and design data from the second design document view is extracted. In an embodiment, a system for providing a computer implemented control system for an automated system includes a data extraction component 304 configured for automatically extracting design data from the first design document view and design data from the second design document view, wherein the design data from the first design document view is related to the design data from the second design document view.

According to an embodiment, the design data from the first and second design document views typically comprise alphanumeric data, positional information and/or configuration information. The data extraction component 304 can be configured for recognizing alphanumeric characters and/or character strings, and for determining other characteristics of the views based on the design data. For example, the data extraction component 304 can be configured to extract data corresponding to a slot number of an I/O rack in a view of the I/O rack, and to extract data corresponding to an I/O control point in a view of the I/O control module.

Referring again to FIG. 2, in block 206, a relationship between the design data from the first design document view and the design data from the second design document view is determined. In an embodiment, a system for providing a computer implemented control system for an automated system includes a matching component 306 configured for determining a relationship between the design data from the first design document view and the design data from the second design document view.

According to an embodiment, the matching component 306 is configured for comparing text in the first design document view to text in the second design document view, and configured for identifying at least a substantial match between the text in the first and second design document views. In an embodiment, the user can select alphanumeric data in the first design document view to be matched with alphanumeric data in the second design document view. The matching component 306 can perform a series of attempts to identify a substantial match. For example, a first attempt can try to find an exact match, or a match of all non-space characters.

If the first attempt is unsuccessful, the matching component 306 supports the notion of a best guess, i.e., a parameterized strategy in determining possibilities for match. For example, best guess matching can be based on matching the first and last characters of a string, and/or every character in between. When a best guess is required, the matching component 306 can present a list of the possible matches, and the portion of the second design document view where the match occurs. The user can then select an item from the list, and the matching text can be presented at the center of the destination document view with an appropriate zoom value. Alternatively, all possible matches can be aggregated in a list, where each element of the list is centered and possibly zoomed on the destination document, and the user can verify the correct match. Because a best guess can be parameterized, scalable strategies and the possibilities of interesting implementations, such as fuzzy logic, or decision trees, are available.

When an exact match and best guess are unsuccessful, the matching component 306 can be configured for allowing the user to perform a manual match. For example, the user can be allowed to explicitly select the design data in the second design document view that "matches" the design data in the first design document view.

As stated above, the design data from the first design document view is related to the design data from the second design document view in such a manner that the related design data in the second design document view provides additional information concerning the design data in the first document view and vice versa. In an embodiment, when a substantial match is identified, the matching component 306 can be configured to determine the relationship between the design data in the second design document view and the design data in the first design document view.

For example, once the match is determined, it can be displayed to the user and the matching component 306 can query the user to select, e.g. from a pull-down menu, which relationship, e.g. a corresponding slot number, should be determined. In another embodiment, the matching component 306 can infer the relationship data according to a set of rendering rules. For example, slot position may be determined by closest proximity of the matching component 306 to a rendered component representing a slot number. In yet another embodiment, the user can explicitly provide the relationship for the matching component 306.

Referring again to FIG. 2, in block 208, when the relationship is determined, it is stored in a data store accessible by the computer implemented control system such that the computer implemented control system controls the plurality of devices in the automated system based on the relationship stored in the data store. In an embodiment, a system for providing a computer implemented control system for an automated system includes a data manager component 308 configured for storing the relationship in a data store 430 accessible by the computer implemented control system.

In an embodiment, when the matching component 306 determines the relationship between design data in the first document view and design data in the second document view, relationship data corresponding to the determined relationship can be received by the data manager component 308. The data manager component 308 can be configured for processing the relationship data and for then storing it in the data store 430. For example, in an embodiment, the data store 430 can be a database and the relationship data 432 can be stored in a plurality of relational tables in the database.

Figure 5C:
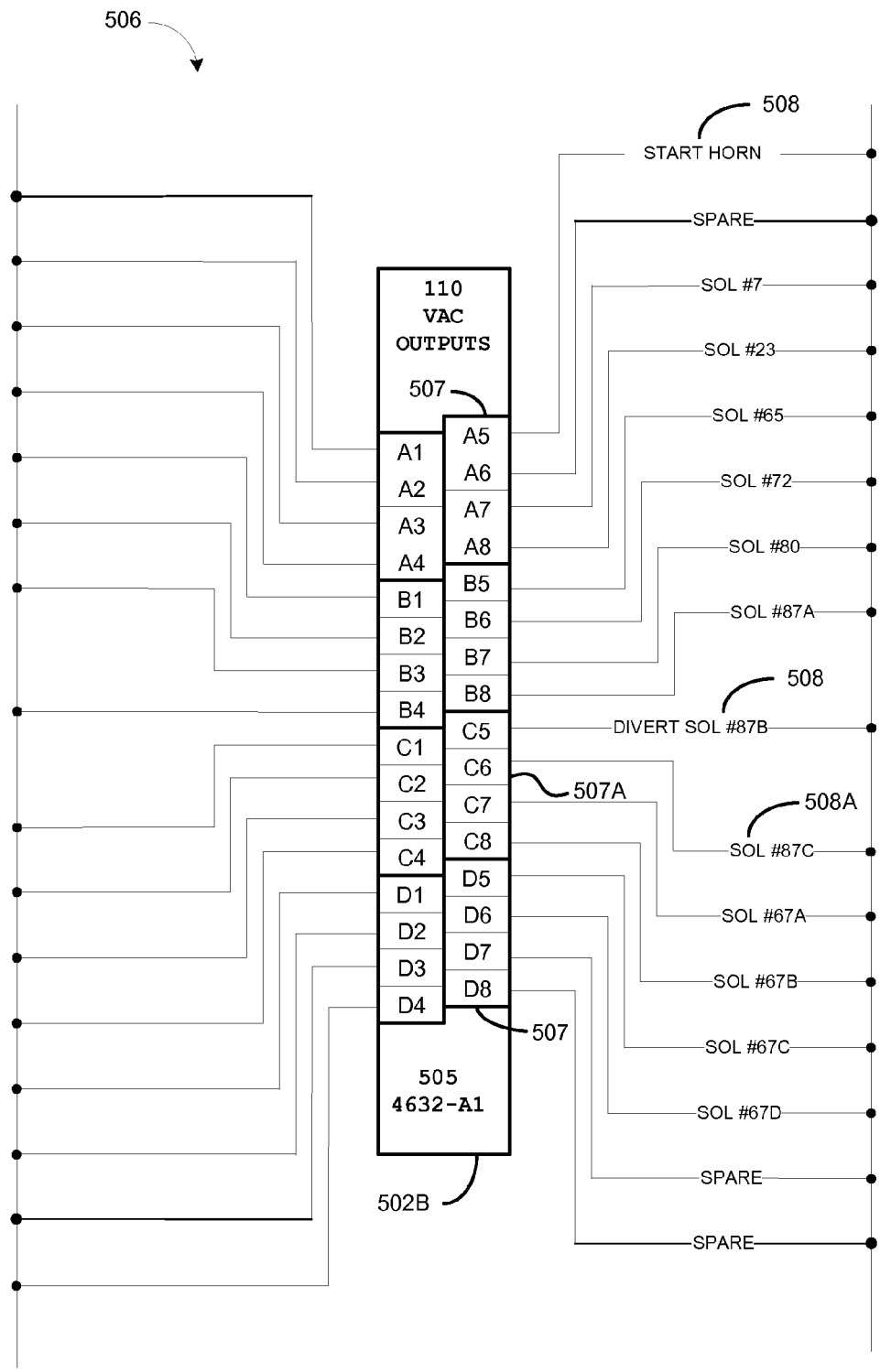

As stated above, the stored relationship data 432 reflects relationships between devices in the automated system and their control environments. For example, when a bill of material stage is launched, the first design document view can be a bill of material (shown in FIG. 5A) and the second design document view can be an I/O distribution document view (shown in FIG. 5B). The bill of material view 500 includes design data identifying a plurality of components including control modules 502, e.g., T.I. 110 VAC input boards having part numbers 505-4232-A1, A1, A3. The I/O distribution document view 504 is associated with an electronic component rack, e.g., a T.I. 505 Series Rack, that comprises a plurality of slots 505, and the design data indicates into which slot of the plurality of slots the control module, e.g., 502A, is mounted. In an embodiment, the user can select a component from the bill of material view 500, e.g., a control module 502A, and the matching component 306 can be configured for comparing text in the first design document view 500 identifying the selected control module, e.g., the part number 505-4232-A1, to text in the second design document view 504.

When a substantial match is determined, the matching component 306 can determine the relationship between the selected design data from the first document view and design data from the second design document view by identifying the slot, e.g., 505A, into which the selected control module 502A is mounted. In an embodiment, the determined relationship is received by the data manager component 308, which is configured to store the relationship data 432 in the data store 430.

When the bill of material stage is completed, a next stage in the RETROFIT build cycle can be implicitly or explicitly launched. For example, after the bill of material stage is completed, a next stage can be an I/O distribution stage, where the I/O distribution document view 504 now becomes the first design document view and the second design document view can be an I/O layout document view (shown in FIG. 5C). The I/O layout document view 506 is associated with a particular control module, e.g., 502B, depicted in the rack represented by the I/O distribution document view 504, where the control module 502B comprises a plurality of control points 507 and each control point 507 is associated with a device 508 of the plurality of devices of the automated system. In an embodiment, the I/O layout document view 506 includes design data indicating which device 508 is associated with each control point 507.

In an embodiment, the user can select a component from the I/O distribution document view 504, e.g., control module 502B, and the matching component 306 can be configured for comparing text in the first design document view identifying the selected control module 502B to text in the second design document view. When a substantial match is determined, the matching component 306 can determine the relationship between the selected design data from the first document view and design data from the second design document view by identifying the plurality of devices 508 associated with the slot 505B into which the selected control module 502B is mounted and for identifying which device, e.g., 508A, is associated with each control point 507A of the selected control module 502B.

Figure 5D:
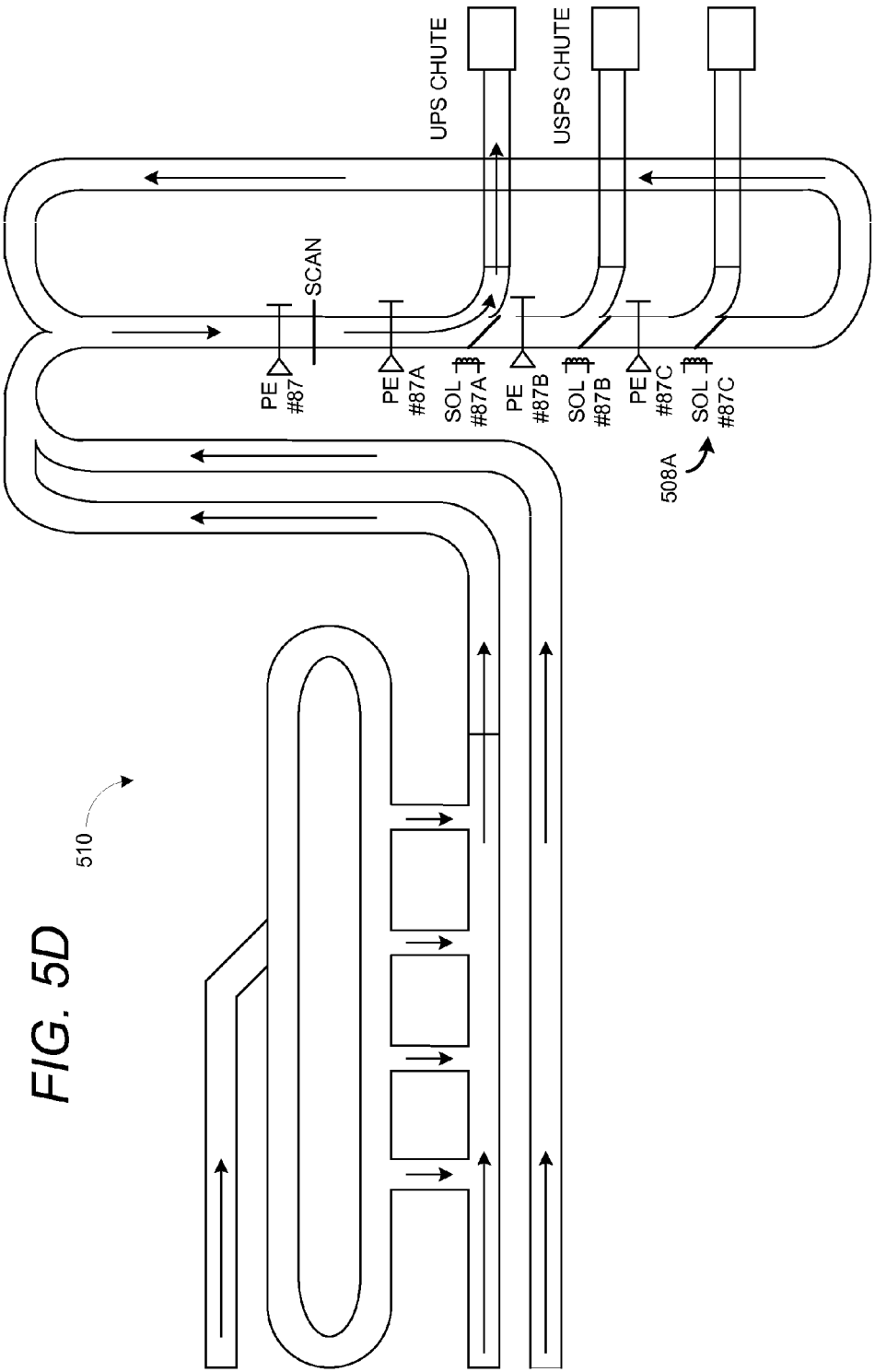

Following the I/O layout stage, a device layout stage can be launched implicitly or explicitly in an embodiment. In this stage, the first design document view can be the I/O layout document view 506 and the second design document view can be an overview schematic document view (shown in FIG. 5D) corresponding to a design layout of the automated system. The overview schematic document view 510 can include design data identifying each device of the plurality of devices and a location associated with each device. In an embodiment, the user can select a device of the plurality of devices from the I/O layout document view 506, e.g., a solenoid #87C 508A, and the matching component 306 can be configured for comparing text in the first design document view identifying the selected device 508A to text in the second design document view. When a substantial match is determined, the matching component 306 can determine the relationship between the selected design data from the first document view and design data from the second design document view by identifying the location in the overview schematic document 510 of the selected device 508A associated with the control point 507A of the control module 502B.

When the location in the overview schematic document view 510 of the selected device 508A is determined, the surrounding environment in which the selected device 508A operates can be ascertained. At this time, device clustering can be performed. In an embodiment, a device cluster is a group of devices that perform a specific function during the operation of the automated system. For example, a package conveyor system can include one or more flow control areas, followed by a two-to-one merge area, followed by an accumulation area, followed by a metering area for a scanner, the actual scanner area, and finally a track sortation area. Each area of the system described above utilizes a plurality of devices that collectively form a device cluster. For example, a two-to-one merge area can typically utilize photo eyes and solenoids that allow for successful merging of boxes from two conveyor lines into one conveyor line.

According to an embodiment, the user can launch, either implicitly or explicitly, a device-clustering build stage to group at least two devices into a cluster using a cluster component 422 in the build manager component 420 (FIG. 4). In an embodiment, the cluster component 422 can be configured for receiving an indication to select at least two devices of the plurality of devices, for example, from the input receiving component 302, and for automatically grouping the at least two devices into a cluster based on a function of the cluster. The user can assign an identifier to the cluster so that it can be identified and/or retrieved. In an embodiment, the cluster and optionally its identifier can then be stored in the data store 430 by the data manager component 308.

During a build stage, in an embodiment, the user can create any sized working set to be processed. For example, the user can select several components in the bill of material 500 for processing and the matching component 306 can determine several respective relationships for each of the selected components. When the relationships are determined and the designated working set is committed, i.e., the relationship data is stored in the data store 430, the next build stage can commence implicitly or by explicit user action. In an embodiment, the user can choose to start any build stage and can even return to a previous build stage to create a new working set.

Alternatively or in addition, in another embodiment, the user can control when to proceed to another build stage at any time regardless of whether the working set is completed. That is, the user can determine and store relationship data associated with a particular entity, e.g., a device 508A, without regard to whether other entities, e.g., devices 508, in the first design document view have been processed. For example, during the device layout stage, the first design document view can be the I/O layout document view 506 and the second design document view can be the overview schematic document view 510 corresponding to the design layout of the automated system. While iterating through the control module 502B, one control point 507 at a time, the user can determine the location of a device 508A in the overview schematic document view 510, and can realize that the device 508A is one of a group of devices forming a two-to-one merge area. In this case, the user can store the relationship data in the data store 432, and then move immediately to another build stage, such as the device cluster stage, so that the cluster can be defined and stored immediately.

As stated above, each build stage can be assigned a set of build parameters, which are used in the configuration session representing each stage. The parameters can be modified during a configuration session, giving the user a runtime tool to affect the look and feel of each session. According to an embodiment, each document view loaded during a build stage configuration session can be assigned its own instance of the build stage parameters such that a user can affect the look and feel of each build stage configuration session on each loaded document view. This kind of runtime flexibility is useful because of the varying nature of each design document. For example, if the majority of text entities in a design document view are colored red, and the parameter representing the boilerplate color assigned to an error condition is also the color red, the user can choose another color representing the error condition. If the user commits these changes to the data store 430, any subsequent error conditions for that document view for that build stage will be represented by that new color.

In another embodiment, a runtime parameterization can be a positioning parameter. Depending on the context, a user may want the build stage to react differently after each event. For example, when a text mapping has just occurred, the user may direct the service to zoom and center both the matched and the matching entity. When the user wants to control the zoom factor, she can use a manual zoom feature, and specify that the matched and matching entity be centered after each match result. In another example, when the user wants to see a playback of all the configured symbols on an overview system drawing view 510, she may want to position the zoom setting so that the entire system view is displayed, then specify none as the positional parameter. In an embodiment, build parameters can fall into at least four categories, including color strategies for session feedback, positioning strategies for look and feel issues, context strategies for drawing management during implicit build stage transitions, and navigation strategies for implicit navigation.

According to an embodiment, when a build plan cycle is completed, each device of the plurality of devices can be associated with a plurality of relationships that can indicate the device's physical location in the automated system, its function relative to surrounding devices, its control module and the control point of the module, and a slot into which the module is mounted in the rack. Because the relationship data is collected and stored, the information can be easily retrieved and presented to a user. For example, the user can "drill down" from the rack to the floor. That is, the user can start with a part number representing an I/O control module and "drill down" to the view of that module in the rack, then "drill down" to a separate view of all the device names assigned to each of the control points for that control module, and then "drill down" again from a device name associated with a control point to a device symbol corresponding to the device name on the factory floor represented by the overview system drawing. The opposite, i.e., "drilling up," is also possible so that relationship data for a device can be ascertained from the factory floor up to the component rack.

Moreover, in another embodiment, as a result of completing the RETROFIT build cycle, the design document views associated with the automated system can be linked to one another. Because they are linked, the design document views, alone or collectively, can provide information about the automated system, its devices, and its operation. For example, the overview system drawing view 510 of the automated system not only can provide views of the design layout of the system and the location of devices, it also can provide relationship data to one or more I/O layout document views 506. Accordingly, when the overview system view 510 is displayed, and when a particular device on the overview system view 510 is selected, e.g., by moving a cursor over the device or clicking on the device, relationship data 432 associated with the selected device can be retrieved from the data store 430 and presented. For instance, the selected device's wiring information, its associated control point and control module, and the control module's slot number in the rack can be easily ascertained and presented.

According to another embodiment, the control system service 400 can also be configured to provide a computer implemented control system for a new automated system. For example, rather than selecting the RETROFIT build plan component 410, the user can select a "DESIGN" build plan component 410 from the list of build plan components. Similar to the RETROFIT build plan component 410, the DESIGN build plan component 410 can include a plurality of stages that guide the user through a design build cycle, which can ultimately result in the generation of design document views and the relationship data 432 associated therewith.

In an embodiment, the design phase of a typical project remains essentially the same, that is, system requirements are specified, and a system solution is proposed. Typically, the layout of the automated system, excluding device control entities, can be rendered, e.g., using a conventional CAD package, and saved as a .DWG or .DXF file. At this stage, the user can invoke the control system service 400 and select the DESIGN build plan component 410. Progressing through a design build cycle can result in the insertion of block entities representing known device entities onto a design document, and in the creation of the design documents themselves, the creation of the relationship data 432, and the mapping of the drawings, from the bottom up.

In an embodiment, design document templates can be provided to assist the user during at least one of the design stages. Using the design templates or using a CAD package of the user's own choosing, the layout of the automated system can be rendered. In addition, the design build cycle can also support device clustering to aid in best practice design. For example, the design build cycle can include a device cluster stage that utilizes templates for common device clusters, such as motor control, line full processing, flow control, various flavors of merging, manual release merging, gap assurance, shipping sortation, and work area sortation clusters.

The device cluster templates can aid in best practice design by supporting the grouping of collections of components and devices bound to each cluster type. Once all devices and components have been selected and resolved into device genus, the cluster can be instantiated with a unique name, and committed to the data store 430. Any future reference to that cluster can be done through use of a dropdown menu. Selection of that cluster on the menu can result in the proper design document view being activated, and centered and zoomed onto the cluster for easy viewing.

Next, when the components and devices are delivered, an installation stage can proceed. In this stage, one or more I/O layout document views 506 (shown in FIG. 5C) can be generated. Each view can list each control point of each control module, which wire is terminated at each point, and which device is connected to that wire. The I/O layout document views 506 can then be used by an installer to wire the system devices to the I/O modules. In addition, an I/O distribution document view 504 can be generated that represents the I/O layout, e.g., a rendering of the rack, a power supply, an I/O scanning controller, and one or more control modules (shown in FIG. 5B). Similar to the RETROFIT build cycle, completion of the DESIGN build cycle results in the creation and storage of the relationship data 432, and the linking or mapping of the views, from the bottom up.

At any point during a build plan cycle, e.g., the RETROFIT or the DESIGN build cycle, the control system service 400 can be configured, in an embodiment, to send the relationship data 432 to a device controller node 610 via a network 601. In an embodiment, the build manager component 420 can direct the message handler component 422 to generate a message that includes at least a portion of the relationship data 432, and to send the message over the network 601 to the device controller node 610. In an embodiment, the message handler component 422 can be configured to transmit the message using any protocol supported by a device controller service operating in an execution environment provided by a node, such as the device controller node 610. The network address of the device controller node 610 can be determined in several ways. For example, it can be provided in the configuration data of the message handler component 422 in the control service node 602, provided by the build manager component 420, provided by a user, and/or generated.

Figure 6:
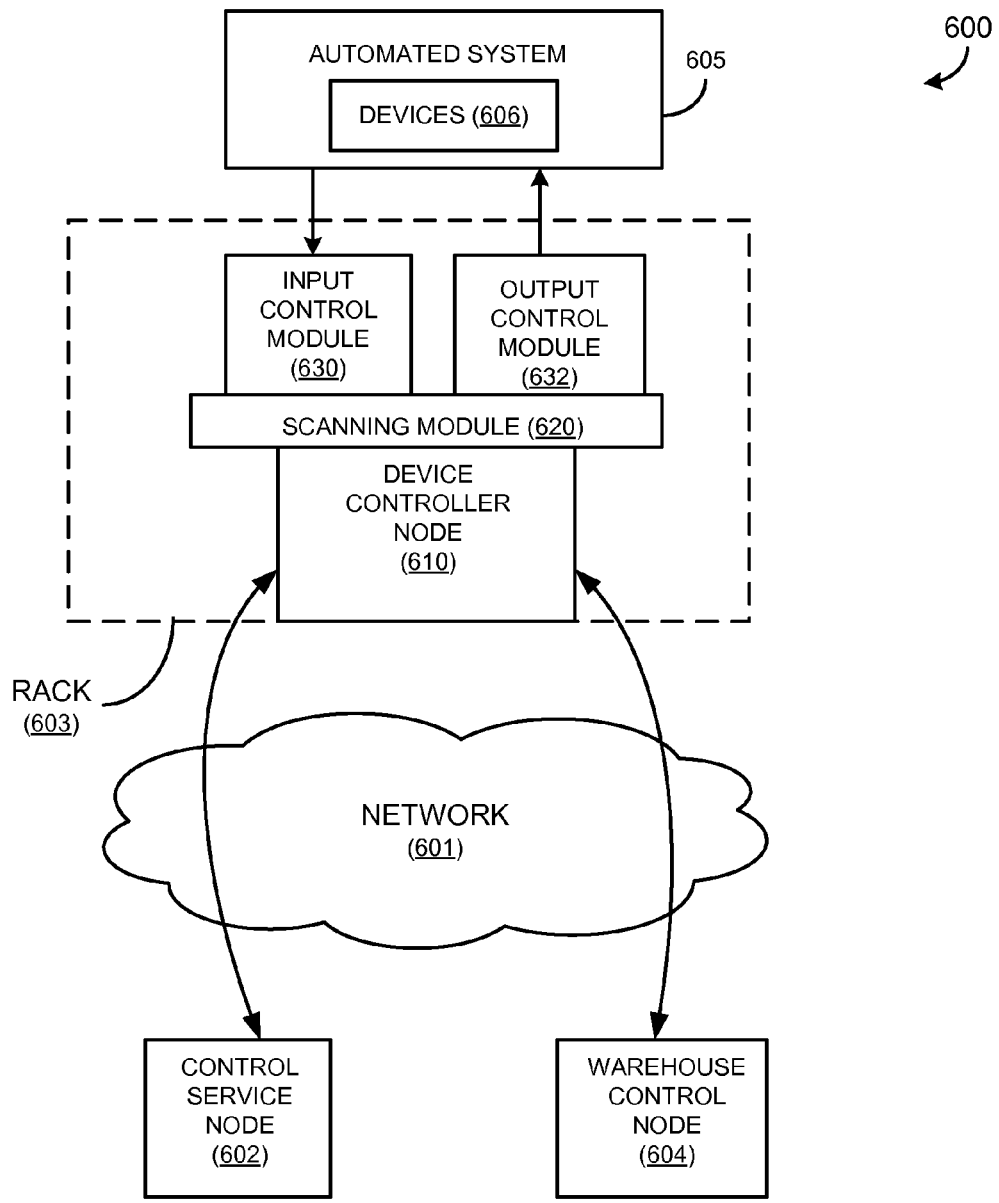
FIG. 6 illustrates a network in which a system for providing a computer implemented control system for an automated system can be implemented.

In an embodiment, the device controller node 610 can include a microprocessor and a memory structure, and can be configured for controlling the devices of an automated system. In FIG. 6, the device controller node 610 can be mounted in a rack 603 sharing a backplane with a scanning module component 620 and at least one I/O control module 630, 632. Each of the plurality of devices 606 of the automated system 605 is coupled to either the input control module 630 or the output control module 632. In an embodiment, the scanning module component 620 can be configured for scanning the states of the I/O control modules 630, 632 and for representing the I/O control points as a bit stream. The bit stream can be transmitted to the device controller node 610, which is configured for controlling each I/O control point based on the bit stream and the relationship data. Accordingly, without the relationship data 432, the device controller node 610 cannot control the automated system 605 and its devices 606.

Figure 7:
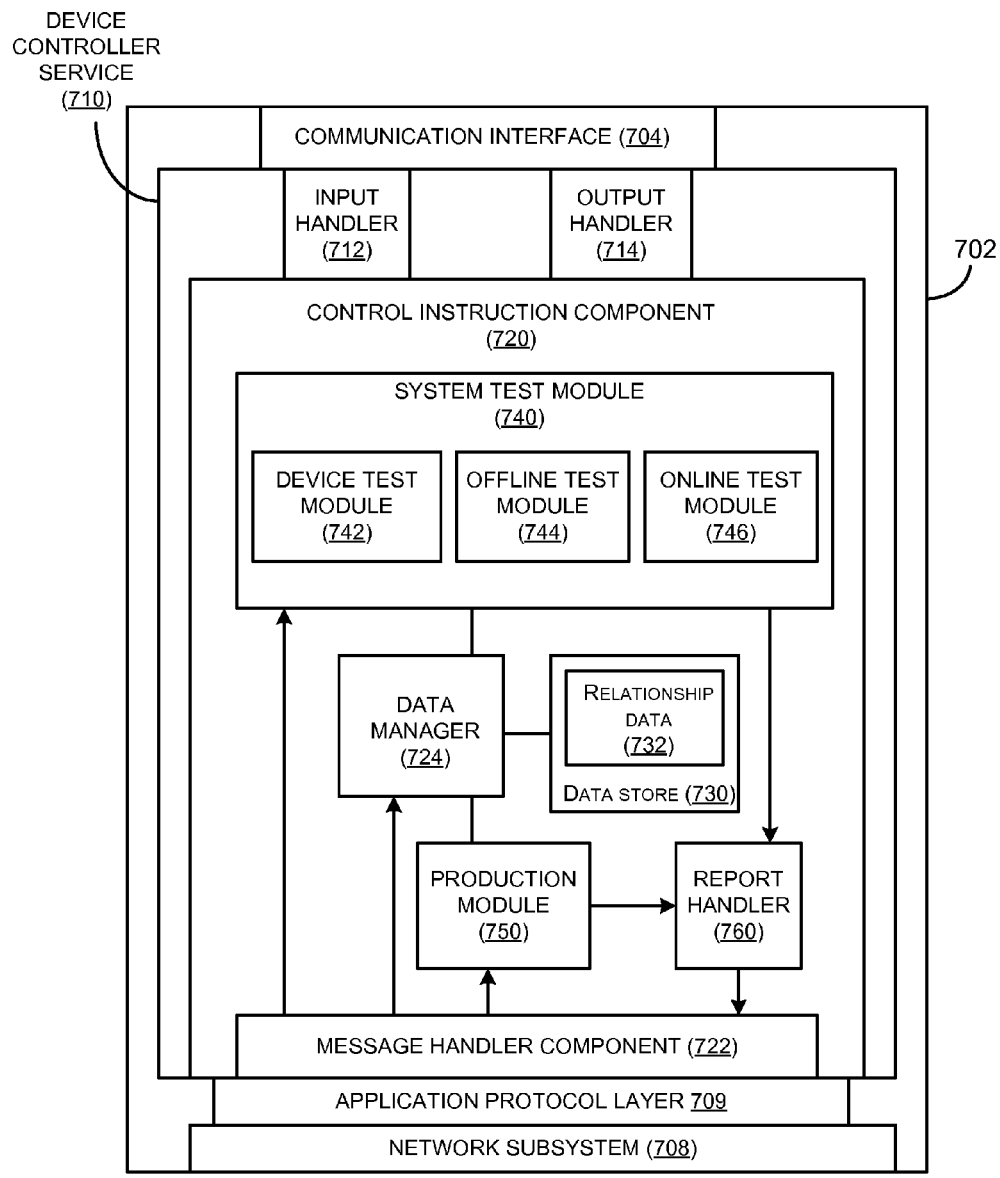
FIG. 7 is a block diagram illustrating a device controller system for an automated system according to an exemplary embodiment.

FIG. 7 illustrates an exemplary device controller service 710 including components adapted for operating in an execution environment 702 provided by a node such as the device controller node 610. According to an embodiment, the device controller service 710 includes a control instruction component 720 configured for managing the control instructions that control the devices in the automated system. The control instruction component 720 can include a message handler component 722 configured for receiving and sending messages via the network 601 from and to nodes, e.g., the control service node 602. In an embodiment, the message handler component 722 can be configured to receive the message including the relationship data 432 from the control service node 602, and to extract and route the relationship data 432 to a data manager component 724 in the control instruction module 720. The data manager component 724 can be configured to manage and store the relationship data 732 in a data store 730.

According to an embodiment, the control instruction component 720 can also include control instruction modules, which when invoked, control the devices 606 based on the relationship data 732 stored in the data store 730. In an embodiment, the control instruction component 720 can include a system test module 740 and a production module 750. The system test module 740 includes control instructions for testing the automated system in a non-production environment. For example, the system test module 740 can include a device test module 742 for testing the function of each device, an offline test module 744 for determining runtime parameters, and an online test module 746 for testing the interaction and/or communication between the automated system and another system. The production module 750 includes control instructions for running the automated system in a production environment.

The device controller service 710 includes an input handler component 712 configured for receiving input data from the input control module 630, e.g., via the scanning module 620, and an output handler component 714 configured for sending output data to the output control module 632. The input 712 and output 714 handler components receive and send data from and to the respective control modules 630, 632 via a communication interface 704 supported by the execution environment 702 provided by the device controller node 610.

The input handler component 712, in an embodiment, can be configured for routing the input data to at least one control instruction module 740, 750. The control instruction module 740, 750 can be configured for receiving the input data from the input handler component 712, for determining an appropriate output response based on the input data and on the relationship data 732, and for providing the output response to another component, such as the output handler component 714 and/or a report handler component 760, depending on control instructions.

As stated above, without the relationship data 732, the device controller service 710 is oblivious to the automated system 605 and its devices 606. Accordingly, once the relationship data 732 is received and stored, the device controller service 710 is operationally linked to the automated system 605 and to the control system service 400. In turn, the control system service 400 is now linked to the automated system 605 via the device controller service 710 so that the user can manage and control the automated system 605 via the control system service 400.

In an embodiment, the control system service 400 can include system manager components configured for managing the automated system 605. The system manager components can include a testing manager component 440 and a production manager component 450. The testing manager component 440 can include a device manager component 442 for testing the functionality of each device, an offline manager component 444 for determining runtime parameters, and an online manager component 446 for testing the interaction and/or communication between the automated system and another system. The production manager component 450 can be configured for monitoring the automated system 605 in a production environment.

In an embodiment, when the automated system 605 has been constructed and the plurality of devices 606 installed and connected to the control modules 630, 632, the user can invoke the device manager component 442 to perform a device functionality test to identify any defective or non-operational devices. In an embodiment, the device manager component 442 can provide a plurality of views which can be used to test device functionality. For example, when invoked, the device manager component 442 can automatically load a view of the automated system 605, e.g., the overview schematic document view 510, and retrieve relationship data 432 from the data store 430 via the data manager component 308. The view can be displayed to the user and the relationship data 432 can be linked to the devices in the view.

Using the view, the user can select a device and test its functionality. For example, in an embodiment, the user can select a device, e.g., a motor, in the view, and designate an action, e.g., "motor on", from a dropdown menu. The device manager component 442 can be configured to generate a request message including information identifying the selected device, relevant relationship data 432, and a request to perform the designated action. The request message can be provided to the message handler component 422, which is configured for sending the request message to the device controller service 710 in the device controller node 610.

When the request message is received, the message handler component 722 in the device controller service 710 can be configured to direct the contents of the request message to the device test module 742 in the control instruction component 720. In an embodiment, the device test module 742 can be configured for processing the request by sending an output signal corresponding to the designated action, e.g., "motor on," to the selected device via the output handler component 714, and by receiving an indication as to a result of the requested action. For example, according to an embodiment, the scanning module 620 can scan the states of the devices coupled to the I/O control points of the I/O control modules 630, 632 and can represent the states of the I/O control points as a bit stream. The bit stream can be received by the device test module 742 via the input handler component 712. Using the relationship data 732 stored in the data store 730, the device test module 742 can determine which bit in the bit stream is associated with the selected device and, in an embodiment, what state, e.g., on/off, is indicated by the bit.

When the device test module 742 receives the indication, e.g., the bit, as to the result of the requested action, the device test module 742 can be configured to invoke a report handler component 760. The report handler component 760, in an embodiment, can be configured to generate a reply message including the indication associated with the selected device. The reply message can be provided to the message handler component 722, which is configured for sending the reply message to the control system service 400 in the control service node 602.

When the reply message is received, the message handler component 422 in the control system service 400 can be configured to provide the indication in the reply message to the device manager component 442 in the testing manager component 440. Based on the indication, the device manager component 442 can be configured to provide to the user the state of the selected device. For example, when the indication corresponds to the "on" state of the selected device, the device can be shown in the overview schematic document view 510 in a particular color, e.g., green, corresponding to the "on" state. Alternatively or in addition, the state of the device can be provided in a pop-up window.

In an embodiment, the control service node 602 can be a portable computing device, such as a laptop or notebook computer, and the user can test the functionality of the devices while walking on the factory floor. The control system service 400 can communicate with the device controller service 710 via a wireless network 601. For example, for a conveyor system, the user can literally walk to a break pack area, load up the view of the end-to-end conveyor system, position the view at the break pack area, and then proceed to test each device assigned to that area. When a motor is tested, it should not only turn on, but the symbol representing the motor in the view can turn a different color. When the motor does not turn on, its symbol in the view can blink a color bound to an error parameter, with an error message available if a cursor hovers over the symbol. When a photo eye is tested, blocking the photo eye can result in the symbol representing the photo eye in the view turning a different color, then returning to its original color when the eye is unblocked. When a divert arm is tested, "Diverter On" can result in the divert arm actually engaged and the symbol representing the divert arm changing color in the view, and "Diverter Off" can result in the divert arm disengaged and the symbol color reverting back in the view.

In addition to testing individual devices, device clusters can also be tested in another embodiment. For example, when the user selects a device cluster, e.g., from a drop down menu, the device manager component 442 can automatically load a view of the selected device cluster in the overview schematic document view 510, and retrieve relationship data 432 from the data store 430 relating to the selected device cluster. In an embodiment, the relationship data 432 related to the device cluster can include information that describes how the devices in the cluster interact with one another. For example, when the device cluster includes a series of motors, the device cluster relationship data 432 can indicate the sequence in which each motor turns on and a delay interval between motor engagements. The view of the device cluster can be displayed to the user and the device cluster relationship data 432 can be linked to the cluster in the view.

When the test is executed by the device test module 742 in the device controller service 710, the appropriate output signals are sent to the devices of the device cluster, and input signals are scanned and transmitted back to the device test module 742. During the test, when the user is standing near the selected device cluster, the user can observe that the devices in the cluster operate as designed. In addition, when the user is not near the selected device cluster, e.g., the user is sitting in a control room, the user can observe the view of the device cluster on the user's control service node 602 to verify the operation of the device cluster. For example, when a motor engages, the motor's symbol in the view can turn a different color and/or can blink. When the user desires to stop the test, the user can issue a termination action and observe each motor's symbol stop blinking and return to its original color when each motor turns off.

In certain cases, parameters for a device cluster depend on real time factors that can only be determined during runtime conditions. For example, in a package conveyor system, a shipping cluster must know the number of tach pulses (one example is provided by a calibrated shaft encoder mounted on the drive shaft of the motor driving the shipping area) required for each package to reach each shipping lane. In an embodiment, the offline manager component 444 can be configured for determining such runtime parameters. When invoked, the offline manager component 444 can be configured to identify device clusters that rely on runtime parameters and to present those clusters in a drop down menu to the user. When the user selects a device cluster, e.g., from the drop down menu, the offline manager component 444 can automatically load a view of the selected device cluster in the overview schematic document view 510, and retrieve relationship data 432 associated with the selected device cluster from the data store 430. The offline manager component 444 can be configured to generate a request message including information identifying the selected cluster, associated relationship data 432, and a request to determine the runtime parameter. The request message can be provided to the message handler component 422, which is configured for sending the request message to the device controller service 710 in the device controller node 610 via the network 601.

When the request message is received by the device controller node 610, the message handler component 722 in the device controller service 710 can be configured to direct the contents of the request message to the offline test module 744 in the control instruction component 720. In an embodiment, the offline test module 744 can be configured to process the request by sending one or more output signals corresponding to one or more actions to one or more devices of the selected device cluster via the output handler component 714, and by receiving one or more indications as to a result of the requested actions. The indications can be returned to the control service node 602 in one or more reply messages generated by the report handler component 760.

When the reply message(s) is received by the control service node 602, the message handler component 422 in the control system service 400 can be configured to provide the indication in the reply message(s) to the offline manager component 444 in the testing manager component 440. Based on the indication(s), the offline manager component 444 can be configured to determine a value of the runtime parameter and to provide the value to the data manager component 308 for storing with the relationship data 432 associated with the device cluster.

For example, for the shipping cluster of the package conveyor system mentioned above, the user can select the shipping cluster from the drop down menu, and the request to determine the tach pulses required for each package to reach each shipping lane can be sent to the device controller node 610. On the factory floor, a package is placed at an induct point of the shipping sorter. As the package travels through the system and as it blocks each photo eye at each shipping lane, indications are sent from the device controller node 610 to the offline manager component 444 in the control service node 602, where tach pulses are tracked and recorded. In an embodiment, at the conclusion of the test, the number of tach pulses for each photo eye can be presented to the user, e.g., when the cursor is placed over a photo eye. This relationship data is associated with the photo eye and/or with the device cluster and stored in the data store 430.

In another embodiment, the user can invoke the online manager component 446 for testing the interaction and/or communication between the automated system and another system. For example, in a package conveyor system, a shipping sorter is configured for communicating with a warehouse control system in a warehouse control node 604 and for receiving lane assignments for incoming packages. When invoked, the online manager component 446 can automatically load a view of the shipping sorter area, and retrieve relationship data 432 associated with the devices and/or device clusters in the area from the data store 430. When the user selects an action, e.g., "initiate test," the online manager component 446 can be configured to generate a request message including information identifying the device(s), associated relationship data 432, and a request to initiate the test. The request message can be sent to the device controller service 710 in the device controller node 610 via the network 601.

When the request message is received by the device controller node 610, the message handler component 722 in the device controller service 710 can be configured to direct the request message to the online test module 746 in the control instruction component 720. In an embodiment, the online test module 746 be configured to process the request by sending one or more output signals corresponding to one or more actions to one or more devices of the selected device cluster via the output handler component 714, and by receiving one or more indications as to a result of the requested actions. The indications can be returned to the control service node 602 in one or more reply messages generated by the report handler component 760.

When the reply message(s) is received by the control service node 602, the message handler component 422 in the control system service 400 can be configured to provide the indication in the reply message(s) to the online manager component 446 in the testing manager component 440. Based on the indication(s), the online manager component 444 can be configured to provide to the user the state of each of the devices and/or device clusters in the area of interest during the test. For example, the user can test the shipping sorter to verify that the conveyor system is communicating with the warehouse control node 604 and is receiving lane assignments for incoming packages by selecting the motor and shipping clusters in the shipping sorter area and starting the test. Using the view, the user can observe a successful execution when a package enters the induct area and is successfully diverted to an assigned lane, where the view of the lane representing the successful divert can be assigned a new success color.

According to another embodiment, when the automated system is ready to be placed in production, the user can invoke the production manager component 450. The production manager component 450 can be configured, in an embodiment, to retrieve relationship data 432 from the data store 430 via the data manager component 308, and to generate a request message including the relationship data 432 and a request to start production. The request message can be sent to the device controller node 610 via the network 601. When the request message is received by the device controller node 610, the message handler component 722 in the device controller service 710 can be configured to route the request to start production to the production module 750 in the control instruction component 720, and to route the relationship data 432 to the data manager component 724 configured for updating and storing the relationship data 732 in a data store 730.

In an embodiment, the production module 750 includes control instructions for running the automated system in a production environment based on the relationship data 732 stored in the data store 730. The production module 750 can be configured for receiving input data from the input handler component 712, for using the relationship data 732 to determine an appropriate output response based on the input data, and for providing the output response to another component, such as the output handler component 714, depending on the control instructions. In an embodiment, the control instructions can direct the production module 750 to send an output response in a message to the production manager component 450 in the control service node 602. For example, in certain circumstances, when the input data indicates a malfunction in the automated system, the control instructions can direct the production module 750 to send an alert message to the production manager component 450. In an embodiment, the production module 750 can invoke the report handler component 760, which can generate the alert message including the malfunction and the affected device(s). The alert message can be sent to the production manager component 450 in the control service node 602.

When the alert message is received, the message handler component 422 in the control system service 400 can be configured to provide the alert message to the production manager component 450, which can provide the alert to the user. For example, in an embodiment, the production manager component 450 can automatically load a view of the automated system 605, e.g., the overview schematic document view 510, and zoom in on the affected device(s). The affected device(s) can be shown in a particular color, e.g., red, corresponding to a malfunction state. Alternatively or in addition, the state of the device(s) can be provided in a pop-up window along with a timestamp and a reason for the alert. When the malfunction is corrected, the affected device(s) can be returned to its original color in the view. In this manner, the production manager component 450 can be used to monitor the automated system in a production environment.

In another embodiment, the production manager component 450 can be configured to allow the user to update the relationship data 432 when needed. For instance, the production manager component 450 can provide a plurality of views of the automated system 605 and the user can select a view. The selected view can be embedded with the relationship data 432 associated with the devices in the view, and the user can access and update that relationship data 432. For example, the user can update a run time parameter in a device cluster to accommodate a change in personnel by selecting a view of the device cluster, placing the cursor over the device, and selecting a run time parameter associated with the device from a drop down menu. The updated relationship data 432 can be transmitted to the device controller service 710, where the data manager component 724 can be configured to update the relationship data 732.

In addition, in an embodiment, the production manager component 450 can be configured to collect production statistics in real time, and to generate reports. For example, the production manager component 450 can track how many packages have entered a sortation track in a specified time period and report that information to the user when requested. In an embodiment, the collected production statistics can be used to operate the automated system 605 more efficiently. For example, when the production statistics indicate that an area of the automated system 605 has been idle for a given period of time, the production manager component 450 can shut down the devices in the idle area. When the production statistics indicate that an area upstream from the idle area becomes active, the production manager component 450 can power up the devices. In this manner, power consumption by the automated system 605 can be minimized, thereby minimizing energy costs.

Although described separately, the testing manager component 440 and the production manager component 450 can be configured to run independently of one another. Accordingly, during production, i.e., while the automated system 605 is operating, the user can invoke a manager component, e.g., the device manager component 442, in the testing manager component 440. For example, during production, the user can test the functionality of a device, e.g., by invoking the device manager component 442, when the production manager component 450 receives an alert that concerns a device malfunction and a precise diagnosis is needed.

According to aspects of an embodiment, the control system service 400 and the device controller service 710, alone or in combination, move the computer implemented control system for an automated system from the closed environment of the PLC, to an open "data driven" environment that uses relationship data 432, 732 stored in a data store 430, 730 to control the automated system. According to an embodiment, design documents, such as computer aided design (CAD) drawings, associated with the automated system can be rendered into design document views, which then can be used to identify the relationships between devices in the automated system and their control environments. Once determined, the relationship data 432, 732 is stored in a data store, for example, in a table in a database, which is accessible by the device controller service 710, and is used to control the plurality of devices 606 in the automated system 605.

The control system service 400 and the device controller service 710 provide substantial advantages over the traditional PLC-based system. For example, by replacing the PLC-based system with the open data driven environment disclosed herein, the ladder logic control instructions can be replaced with control instructions provided in a standard programming language, such as "C", C++, etc. In addition, because the relationship data 432 is stored and can be retrieved each time a new instance of a view is loaded, ordinarily static legacy CAD drawings describing an automated system can be transformed into views that are collectively a dynamic, interactive portal to the automated system—a virtual system where the view is, for all intents and purposes, the system. Moreover, the control system service 400 and the device controller service 710 provide a convenient and user friendly tool that allows the user to complete a project life-cycle, i.e., design, install, configure, and test, in a shorter time period than previously needed. For example, the views can be used interactively to configure the system, to test the system, to control the system, and/or to upgrade the system. During production, the views can function as a user interface for monitoring and maintaining the system.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system for providing a computer implemented control system for an automated system, the system comprising:
    a document receiving component configured for receiving a plurality of design documents associated with an existing automated system and for rendering at least three design document views corresponding to the plurality of design documents, wherein the automated system comprises a plurality of devices controlled by a computer implemented control system;
    an input receiving component configured for receiving an indication selecting a first design document view and a second design document view from the at least three rendered design document views, wherein the first design document view is an input/output (I/O) distribution document view that is associated with an electronic component rack that comprises a plurality of slots and the second design document view is a bill of material document view that includes design data identifying a control module, wherein the input/output (I/O) distribution document view includes design data indicating into which slot of the plurality of slots the control module is mounted;
    a data extraction component configured for automatically extracting design data from the first design document view and design data from the second design document view, wherein the design data from the first design document view is related to the design data from the second document view;
    a matching component configured for determining a relationship between the design data from the first design document view and the design data from the second design document view by comparing text in the first design document view to text in the second design document view; and
    a data manager component configured for storing the relationship in a data store accessible by the computer implemented control system, wherein the computer implemented control system controls the plurality of devices in the automated system based on the relationship stored in the data store,
    wherein at least one of the system components comprises at least one electronic hardware component.

2. The system of claim 1 wherein the matching component is also configured for identifying at least a substantial match between the text in the first and second design document views.

3. The system of claim 2 wherein when a substantial match is determined, the matching component is further configured for identifying the slot into which the control module is mounted.

4. The system of claim 1 wherein the control module comprises a plurality of control points and each control point is associated with a device of the plurality of devices of the automated system, and wherein the at least three design document views further includes an I/O layout document view associated with the control module, wherein the I/O layout document view includes design data indicating with which control point each device is associated.

5. The system of claim 4 wherein the input receiving component is configured for receiving an indication selecting the I/O layout document view as a third design document view, and wherein the matching component is configured for comparing text in the first design document view to text in the third design document view and, when a substantial match is determined, for identifying the plurality of devices associated with the slot into which the control module is mounted and for identifying which device is associated with each control point of the control module.

6. The system of claim 5 wherein the at least three design document views further includes an overview schematic document view corresponding to a design layout of the automated system, wherein the overview schematic document view includes design data identifying each device of the plurality of devices and a location associated with each device.

7. The system of claim 6 wherein the input receiving component is configured for receiving an indication selecting the overview schematic document view as a fourth design document view, and wherein the matching component is configured for comparing text in the third design document view identifying a device of the plurality of devices to text in the fourth design document view and, when a substantial match is determined, for identifying the location of the device associated with the control point of the control module.

8. The system of claim 7 further comprising a cluster component configured for receiving an indication to select at least two devices of the plurality of devices, and for automatically grouping the at least two devices into a cluster based on a function of the cluster; and wherein the database manager component is configured for storing the cluster in the data store.

9. The system of claim 1 further comprising a message handler component configured for sending relationship data stored in the data store to a device controller node via a network, wherein the device controller node comprises a microprocessor and a memory structure configured for implementing control instructions based on the relationship data.

10. A method for providing a computer implemented control system for an automated system, the method comprising:
receiving by a document receiving component a plurality of design documents associated with an automated system and rendering at least three design document views corresponding to the plurality of design documents, wherein the automated system comprises a plurality of devices controlled by a computer implemented control system;
receiving by an input receiving component an indication to select a first design document view and a second design document view from the at least three rendered design document views, wherein the first design document view is an input/output (I/O) distribution document view that is associated with an electronic component rack that comprises a plurality of slots and the second design document view is a bill of material document view that includes design data identifying a control module, wherein the input/output (I/O) distribution document view includes design data indicating into which slot of the plurality of slots the control module is mounted;
extracting automatically by a data extraction component design data from the first design document view and design data from the second design document view, wherein the design data from the first design document view is related to the design data from the second document view;
determining by a matching component a relationship between the design data from the first design document view and the design data from the second design document view by comparing text in the first design document view to text in the second design document view; and
storing by a data manager component the relationship in a data store accessible by the computer implemented control system, wherein the computer implemented control system controls the plurality of devices in the automated system based on the relationship stored in the data store, wherein at least one of the preceding actions is performed on at least one electronic hardware component.

11. The method of claim 10 wherein determining the relationship between the design data from the first design document view and the design data from the second design document view includes identifying at least a substantial match between the text in the first and second design document views.

12. The method of claim 11 wherein when a substantial match is determined, determining the relationship includes identifying the slot into which the control module is mounted.

13. The method of claim 10 wherein the control module comprises a plurality of control points and each control point is associated with a device of the plurality of devices of the automated system, and wherein the at least three design document views further includes an I/O layout document view associated with the control module, wherein the I/O layout document view includes design data indicating with which control point each device is associated.

14. The method of claim 13 further comprising receiving an indication selecting the I/O layout document view as a third design document view, comparing text in the first design document view to text in the third design document view and, when a substantial match is determined, identifying the plurality of devices associated with the slot into which the control module is mounted and identifying which device is associated with each control point of the control module.

15. The method of claim 14 wherein the at least three design document views further includes an overview schematic document view corresponding to a design layout of the automated system, wherein the overview schematic document view includes design data identifying each device of the plurality of devices and a location associated with each device.

16. The method of claim 15 further comprising receiving an indication selecting the overview schematic document view as a fourth design document view, comparing text in the third design document view identifying a device of the plurality of devices to text in the fourth design document view and, when a substantial match is determined, identifying the location of the device associated with the control point of the control module.

17. The method of claim 16 further comprising receiving an indication to select at least two devices of the plurality of devices, automatically grouping the at least two devices into a cluster based on a function of the cluster, and storing the cluster in the data store.

18. A computer readable non-transitory storage medium containing program instructions when executed by a computer implementing a process for providing a computer implemented control system for an automated system, the process comprising:

receiving by a document receiving component a plurality of design documents associated with an automated system and rendering at least three design document views corresponding to the plurality of design documents, wherein the automated system comprises a plurality of devices controlled by a computer implemented control system;

receiving by an input receiving component an indication to select a first design document view and a second design document view from the at least three rendered design document views, wherein the first design document view is an input/output (I/O) distribution document view that is associated with an electronic component rack that comprises a plurality of slots and the second design document view is a bill of material document view that includes design data identifying a control module, wherein the input/output (I/O) distribution document view includes design data indicating into which slot of the plurality of slots the control module is mounted;

extracting automatically by a data extraction component design data from the first design document view and design data from the second design document view, wherein the design data from the first design document view is related to the design data from the second document view;

determining by a matching component a relationship between the design data from the first design document view and the design data from the second design document view by comparing text in the first design document view to text in the second design document view; and storing by a data manager component the relationship in a data store accessible by the computer implemented control system, wherein the computer implemented control system controls the plurality of devices in the automated system based on the relationship stored in the data store.

* * * * *